US 11,904,744 B2

(12) United States Patent
Nagai et al.

(10) Patent No.: US 11,904,744 B2
(45) Date of Patent: Feb. 20, 2024

(54) VEHICLE-MOUNTED SEAT DEVICE

(71) Applicant: Toyota Jidosha Kabushiki Kaisha, Toyota (JP)

(72) Inventors: Tetsuya Nagai, Okazaki (JP); Kohshi Katoh, Toyota (JP); Takashi Sugimoto, Anjyo (JP); Osamu Oda, Toyota (JP); Masatoshi Hada, Nagakute (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 552 days.

(21) Appl. No.: 17/029,421

(22) Filed: Sep. 23, 2020

(65) Prior Publication Data

US 2021/0086669 A1    Mar. 25, 2021

(30) Foreign Application Priority Data

Sep. 25, 2019  (JP) ................................ 2019-174660

(51) Int. Cl.
*B60N 2/50*    (2006.01)
*B60N 2/68*    (2006.01)
*B60N 2/22*    (2006.01)

(52) U.S. Cl.
CPC .............. *B60N 2/503* (2013.01); *B60N 2/68* (2013.01); *B60N 2/682* (2013.01); *B60N 2/505* (2013.01); *B60N 2002/2204* (2013.01)

(58) Field of Classification Search
CPC .................... B60N 2/503; B60N 2/505; B60N 2002/2204; B60N 2/68; B60N 2/682; B60N 2/6671; B60N 2/7094
See application file for complete search history.

(56) References Cited

U.S. PATENT DOCUMENTS

| | | | | |
|---|---|---|---|---|
| 5,395,089 A | * | 3/1995 | Yamauchi | B60N 2/505 297/308 |
| 6,692,074 B1 | * | 2/2004 | Kopetzky | B60N 2/666 297/284.4 |
| 6,824,212 B2 | * | 11/2004 | Malsch | B60N 2/66 297/216.12 |
| 7,140,680 B2 | * | 11/2006 | McMillen | B60N 2/859 297/284.4 |

(Continued)

FOREIGN PATENT DOCUMENTS

EP      3279029 A1     2/2018
JP      2015-209131 A  11/2015

(Continued)

*Primary Examiner* — Taylor Morris
(74) *Attorney, Agent, or Firm* — Dinsmore & Shohl LLP

(57) ABSTRACT

A vehicle-mounted seat device includes an SB main frame, a back rest which the back of a seated person leans on, a relay disc fixed to the back rest, a first engagement member fixed with respect to the SB main frame at a position higher than the relay disc, an upper wire for suspending and holding the back rest from the first engagement member so as to be able to swing with respect to the SB main frame with the relay disc being the center, and a height adjustment mechanism constructed to be capable of pulling in part of the upper wire, so that an amount by which the upper wire is pulled in is changed to cause a change in disposed height of the back rest with respect to the SB main frame.

11 Claims, 15 Drawing Sheets

(56) References Cited

U.S. PATENT DOCUMENTS

| | | | |
|---|---|---|---|
| 7,234,769 B2* | 6/2007 | Takenaka | B60N 2/42781 297/216.12 |
| 7,270,374 B2* | 9/2007 | Moriggi | B60N 2/865 297/284.7 |
| 7,523,987 B2* | 4/2009 | Yamaguchi | B60N 2/888 297/216.12 |
| 7,905,545 B2* | 3/2011 | Andersson | B60N 2/0232 297/452.52 |
| 8,840,186 B2* | 9/2014 | Samain | F16C 1/101 297/284.3 |
| 8,979,193 B2* | 3/2015 | Nonomiya | B60N 2/682 297/216.13 |
| 9,873,364 B2* | 1/2018 | Hamabe | B60N 2/68 |
| 10,239,421 B2* | 3/2019 | Katoh | B60N 2/686 |
| 10,492,966 B2* | 12/2019 | DuFresne | A47C 7/32 |
| 10,556,529 B2* | 2/2020 | Seibold | B60N 2/42 |
| 10,988,063 B2* | 4/2021 | Katoh | B60N 2/682 |
| 11,040,647 B2* | 6/2021 | Nagai | B60N 2/853 |
| 11,135,944 B2* | 10/2021 | Sugimoto | B60N 2/02 |
| 11,260,780 B2* | 3/2022 | Nagai | B60N 2/4214 |
| 11,299,119 B2* | 4/2022 | Nagai | B60R 21/207 |
| 11,305,677 B2* | 4/2022 | Nagai | B60N 2/68 |
| 11,458,874 B2* | 10/2022 | Nagai | B60N 2/10 |
| 2013/0134749 A1* | 5/2013 | Awata | B60N 2/427 297/216.13 |
| 2015/0145303 A1* | 5/2015 | Line | B60N 2/5825 297/283.3 |
| 2015/0306982 A1 | 10/2015 | Hamabe et al. | |
| 2015/0367756 A1 | 12/2015 | Katoh et al. | |
| 2018/0022238 A1* | 1/2018 | Gonzalez Uribe | B60N 2/39 297/325 |
| 2018/0072187 A1* | 3/2018 | Katoh | B60N 2/7094 |
| 2019/0070989 A1* | 3/2019 | Klap | B60N 2/5858 |
| 2019/0111816 A1 | 4/2019 | Katoh | |
| 2020/0353854 A1* | 11/2020 | Nagai | B60N 2/7094 |
| 2021/0129723 A1* | 5/2021 | Line | B60N 2/7094 |

FOREIGN PATENT DOCUMENTS

| | | | | |
|---|---|---|---|---|
| JP | 2016-005938 A | | 1/2016 | |
| JP | 2018-020595 A | | 2/2018 | |
| JP | 2019-073047 A | | 5/2019 | |
| JP | 2020059327 A | * | 4/2020 | |
| WO | WO-2015077231 A1 | * | 5/2015 | ........... B60N 2/0244 |

* cited by examiner

VEHICLE-MOUNTED SEAT DEVICE

CROSS REFERENCE TO RELATED APPLICATION

This application claims priority to Japanese Patent Application No. 2019-174660 filed on Sep. 25, 2019, which is incorporated herein by reference in its entirety including the specification, claims, drawings, and abstract.

TECHNICAL FIELD

The present disclosure relates to a seat device mounted on a vehicle.

BACKGROUND

A vehicle-mounted seat device usually has a seat cushion for supporting the hips of an occupant seated on the vehicle-mounted seat device (hereinafter referred to as a "seated person"), and a seat back for supporting the back of the seated person. The seat back further has a back rest for the seated person to lean on, and a frame for supporting the back rest. JP No. 2019-73047A discloses a vehicle-mounted seat device including a back rest capable of swinging to right and left. A frame in the JP No. 2019-73047A has a seat back frame and a sub frame. The sub frame is connected to the seat back frame through a plate spring, and is swingable with respect to the seat back frame. A net structure consisting of a plurality of radially extending linear parts is attached to the sub frame. The back rest is disposed in front of the net structure. Such a construction makes it possible to achieve appropriate cushioning properties due to tension of the linear parts, and allows the back rest to swing together with the sub frame with respect to the seat back frame.

When the back rest is swingable with respect to the seat back frame, sway generated in the right-left direction during travel of a vehicle can be absorbed by movement of the body rather than the head, thereby stabilizing a posture of the head of a seated person. It is widely known that the posture of the head can be made more stable, especially when the center of the swing is located at the same height as that of the shoulder blade of the seated person.

Naturally, the height of the shoulder blades when a person is seated on the vehicle-mounted seat device varies with physical size of the person. In conventional vehicle-mounted seat devices, however, the height of the swing center of the back rest cannot be changed. As a result, appropriate swing cannot be obtained depending on the physical size of a seated person because the height of the swing center of the back rest cannot be adjusted to the height of the shoulder blades.

In view of the above, the present disclosure provides a vehicle-mounted seat device capable of changing a height of a swing center of a back rest.

SUMMARY

A vehicle-mounted seat device described in the present disclosure includes a seat back main frame standing in a vehicle cabin, a back rest which a back of a seated person leans on, a relay disc fixed at a center of the back rest in a width direction, a first engagement member fixed with respect to the seat back main frame at a position higher than the relay disc, an upper suspension member provided between the relay disc and the first engagement member for suspending and holding the back rest so as to be able to swing with respect to the seat back main frame with the relay disc being the center, and a height adjustment mechanism constructed to be capable of pulling in part of the upper suspension member, so that an amount by which the upper suspension member is pulled in is changed to cause a change in disposed height of the back rest with respect to the seat back main frame.

Such a structure makes it possible to freely change a height of the back rest which a seated person leans on in accordance with physical size and preference of the person. As a result, the back rest can be swung more appropriately.

In this case, the height adjustment mechanism may have one or more movable members for moving manually or automatically with part of the upper suspension member connected or hooked thereto.

The amount by which the upper suspension member is pulled in can be changed by moving such a movable member.

The first engagement member and the relay disc are provided with a pulley for hooking the upper suspension member, and the upper suspension member may be provided in a form of a closed loop routed through the first engagement member and the relay disc.

Such a structure enables reduction in friction between the upper suspension member and the first engagement member and the relay disc when the amount by which the upper suspension member is pulled in is changed, thereby smoothly changing a length of the upper suspension member and reducing wear of the upper suspension member.

The device may further include a seat back sub frame mounted to the back rest and capable of swinging together with the back rest with respect to the seat back main frame, and a seat back middle frame fixed to the seat back main frame. The back rest is suspended and held by the upper suspension member from the seat back middle frame so as to be able to swing with respect to the seat back middle frame. The back rest and the seat back sub frame may be mounted to the seat back main frame through the seat back middle frame.

In this case, the back rest, the seat back sub frame, and the seat back middle frame form a seat back assembly that is attachable to the seat back main frame. This structure makes it possible to use a generally-used conventional seat back main frame as the seat back main frame without any change, thereby reducing component cost. It also makes it possible to assemble the seat back assembly independently from the seat back main frame, thereby improving productivity of the seat back main frame.

The device may further include a rear restraint bracket fixed to the seat back sub frame, a front restraint bracket disposed in front of, and opposite to, the rear restraint bracket, and a restraint component placed between the rear restraint bracket and the front restraint bracket and provided as a linear member for defining a position of the seat back sub frame in a front-back direction with respect to the seat back middle frame. The front restraint bracket may be mounted to the seat back middle frame so as to be elevated or lowered together with the seat back sub frame.

By thus allowing the front restraint bracket to be elevated or lowered together with the seat back sub frame, tension of the restraint component can be kept constant even if the back rest is elevated or lowered.

Further, the device may include a guide slit formed in the seat back middle frame and elongated in an up-down direction, a connection bush fixed to the front restraint bracket and having a penetration hole formed at a center thereof, and a connection pin inserted through the penetration hole of the connection bush and the guide slit and having an end fixed to the seat back sub frame. The front restraint bracket may also be elevated or lowered by elevating or lowering the connection pin together with the seat back sub frame.

Such a structure allows the front restraint bracket to be elevated or lowered together with the seat back sub frame.

The device may further include a pair of right and left second engagement members provided in the right-left direction of the relay disc on a front upper side thereof and fixed with respect to the seat back main frame, a pair of right and left third engagement members provided in the right-left direction of the relay disc on a front lower side thereof and fixed with respect to the seat back sub frame, and a pair of right and left suspension members provided in a closed loop to route through at least the second engagement member, the relay disc, and the third engagement member. When the amount by which the upper suspension member is pulled in is changed, the relay disc may move in the front-back direction, as well as the up-down direction, so as to balance tensions of the upper suspension member and the pair of right and left suspension members.

Such a structure makes it possible to maintain constant tensions of the right and left suspension members even if the back rest is elevated or lowered.

In this case, a second pulley for hooking a corresponding one of the pair of right and left suspension members may be provided on either side of a central line of the relay disc in the right-left direction.

Such a structure enables reduction in friction generated when the right and left suspension members slide, thereby reducing wear of the right and left suspension members.

The vehicle-mounted seat device described in the present disclosure makes it possible to change a height of a swing center of the back rest.

BRIEF DESCRIPTION OF DRAWINGS

Embodiments of the present disclosure will be described based on the following figures, wherein.

DESCRIPTION OF EMBODIMENTS

Figure 1:
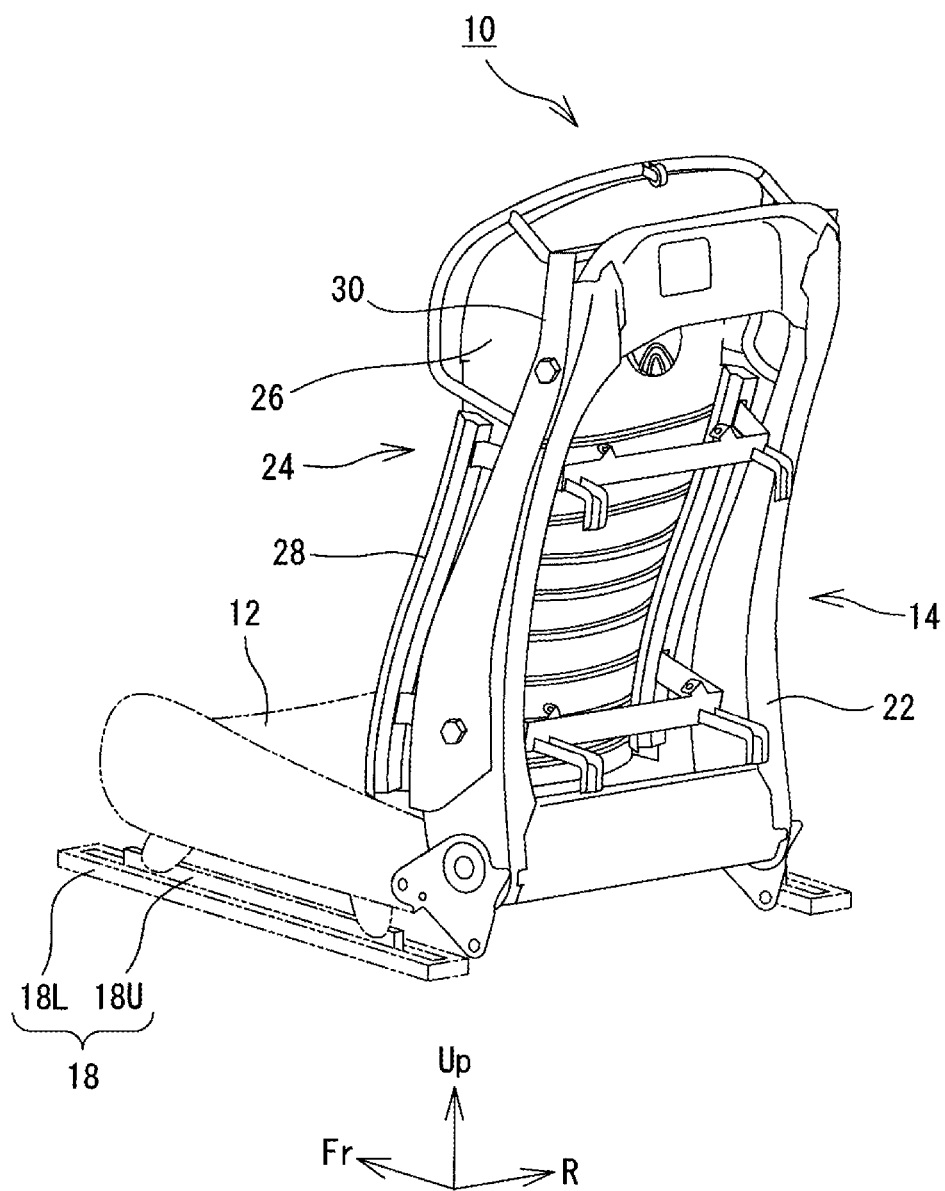
FIG. 1 is a perspective view showing a vehicle-mounted seat device from behind.

A structure of a vehicle-mounted seat device 10 will now be described with reference to the drawings. FIG. 1 is a perspective view of the vehicle-mounted seat device 10 from diagonally behind. In the following description, unless otherwise specified, "up-down", "front-back", and "right-left" refer to the directions viewed from an occupant (hereinafter referred to as a "seated person") seated in the vehicle-mounted seat device 10. In respective drawings, "Fr", "Up" and "R" indicate forward, upward, and rightward, respectively. In the present disclosure, a seat back is abbreviated as "SB" when needed.

The vehicle-mounted seat device 10 is mounted in a vehicle, and used, for example, as a front seat such as a driver's seat or a passenger seat. The vehicle-mounted seat device 10 is roughly divided into a seat cushion 12 for supporting a hip of a seated person, and a seat back 14 for supporting a back of the seated person. Because conventional techniques are used for the structure of the seat cushion 12, detailed description will not be given here. In addition, FIG. 1 only roughly shows the shape of the seat cushion 12.

A slide rail 18 is attached to a floor surface of a vehicle cabin. The slide rail 18 has a lower rail 18L fixed to the floor surface of the vehicle cabin and extending in the front-back direction, and an upper rail 18U slidable along the lower rail 18L. Four corners of the seat cushion 12 are connected to the upper rail 18U, so that the vehicle-mounted seat device 10 can slide in the front-back direction.

Figure 2:
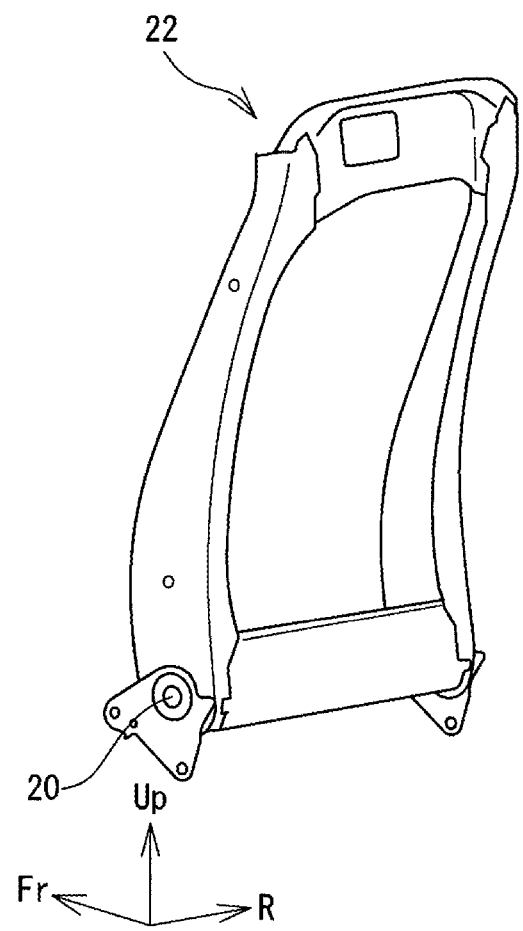
FIG. 2 is a perspective view showing an SB main frame.
Figure 3:
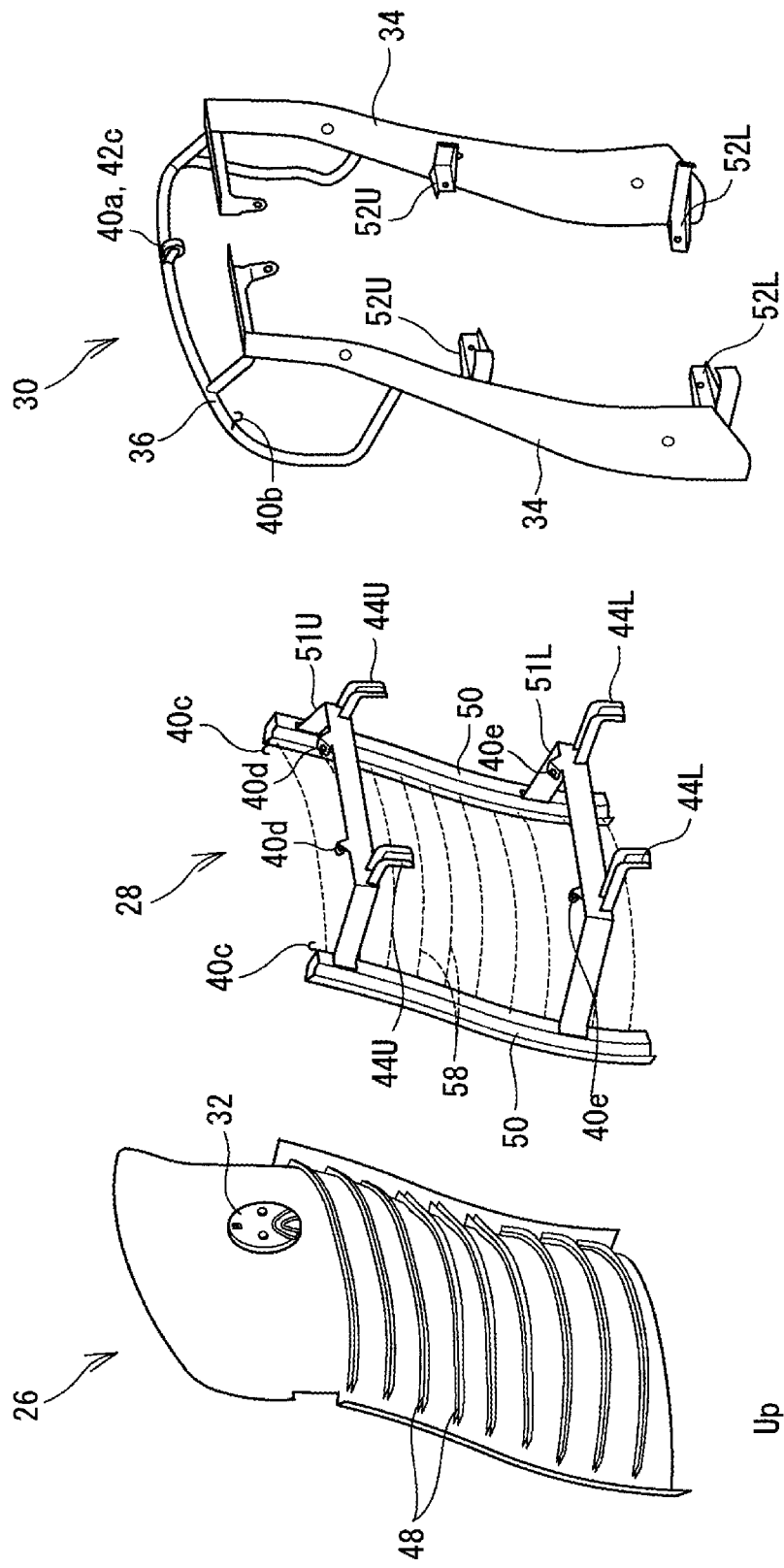
FIG. 3 is an exploded perspective view of an SB assembly.

The seat back 14 is roughly divided into an SB main frame 22 and an SB assembly 24. FIG. 2 is a perspective view of the SB main frame 22, and FIG. 3 is an exploded perspective view of the SB assembly 24. The SB main frame 22 is a frame component standing in the vehicle cabin and made of a highly rigid metal material (such as steel). Referring to FIG. 2, the SB main frame 22 is structured by connecting four frame components vertically and horizontally disposed, and is substantially O-shaped when viewed from the front. A reclining axis 20 extending in the right-left direction is set in the proximity of a lower end of the SB main frame 22. The SB main frame 22 is swingably connected to the seat cushion 12 through the reclining axis 20. By swinging the SB main frame 22 around the reclining axis 20, the entire seat back 14 can be swung (i. e. reclined) with respect to the seat cushion 12.

The SB assembly 24 is formed by a back rest 26, an SB sub frame 28, and an SB middle frame 30 combined with one another. The SB middle frame 30 is a frame component fixed to the SB main frame 22, and its position is not changed with respect to the SB main frame 22. The back rest 26 is a thin plate component on which the back of the seated person leans. The back rest 26 is held suspended from the SB middle frame 30, and swingable with respect to the SB middle frame 30 and consequently the SB main frame 22. The SB sub frame 28 is attached to the back of the back rest 26, and is swingable, together with the back rest 26, with respect to the SB middle frame 30 and consequently the SB main frame 22.

More specifically, the SB middle frame 30 has a pair of side frames 34 extending in the up-down direction, and a support pipe 36 extending from the pair of side frames 34. Each of the side frames 34 overlaps an outer side surface of the SB main frame 22, and fastened with a bolt to the SB main frame 22. To a front end of the side frame 34, an upper front restraint bracket 52U and a lower front restraint bracket 52L (hereinafter referred to as a "front restraint bracket 52" when no distinction is made between upper and lower) are attached so that they can be elevated or lowered. A front end of a front-back wire 66 described below is fixed to the front restraint bracket 52. Description will be given later.

The back rest 26 is a component used for supporting the back of a seated person, and smoothly curved to fit the shape of the back of the person. A relay disc 32 is fixed at a position located at a center in the right-left direction on a back surface of the back rest 26. The relay disc 32 is provided at a position upper than the center of the back rest 26 in a height direction. The relay disc 32 is a disc-shaped component having a diameter sufficiently larger than a dimension thereof in an axis direction. The relay disc 32 is provided with a pulley 42 and a wire groove 46 (see FIG. 5) for hooking the wire described later. A plurality of wire guides 48 are disposed under the relay disc 32 on the back surface of the back rest 26, spaced apart from one another in the up-down direction. The wire guide 48 is used for guiding the disposed position of a horizontal wire 58 described below and formed by a rib standing from the back surface of the back rest 26.

The SB sub frame 28 is a frame component attached to the back surface of the back rest 26. The SB sub frame 28 has a pair of vertical frames 50, an upper horizontal frame 51U and a lower horizontal frame 51L (hereinafter referred to as a "horizontal frame 51" when no distinction is made between upper and lower), and a plurality of horizontal wires 58. The vertical frame 50 is a frame component extending in the up-down direction, and attached to each of right and left ends of the back rest 26. The horizontal frame 51 connects the pair of vertical frames 50.

When viewed from above, the horizontal frame 51 protrudes rearward from the vertical frame 50, i.e. toward the SB middle frame 30, in a substantially U-shape. A pair of upper rear restraint brackets 44U and a pair of fourth engagement members 40d are fixed to the upper horizontal frame 51U. A pair of lower rear restraint brackets 44L (hereinafter referred to as a "rear restraint bracket 44" when no distinction is made between upper and lower) and a pair of fifth engagement members 40e are fixed to the lower horizontal frame 51L.

The fourth engagement members 40d and the fifth engagement members 40e are the parts where below-described ends of a lower wire 64 are engaged. The rear restraint bracket 44 is a part to which a rear end of a front-back wire 66 described below is fixed. The horizontal wire 58 is the wire provided between the pair of vertical frames 50, supporting the back rest 26 from behind and receiving the load from the seated person.

Figure 4:
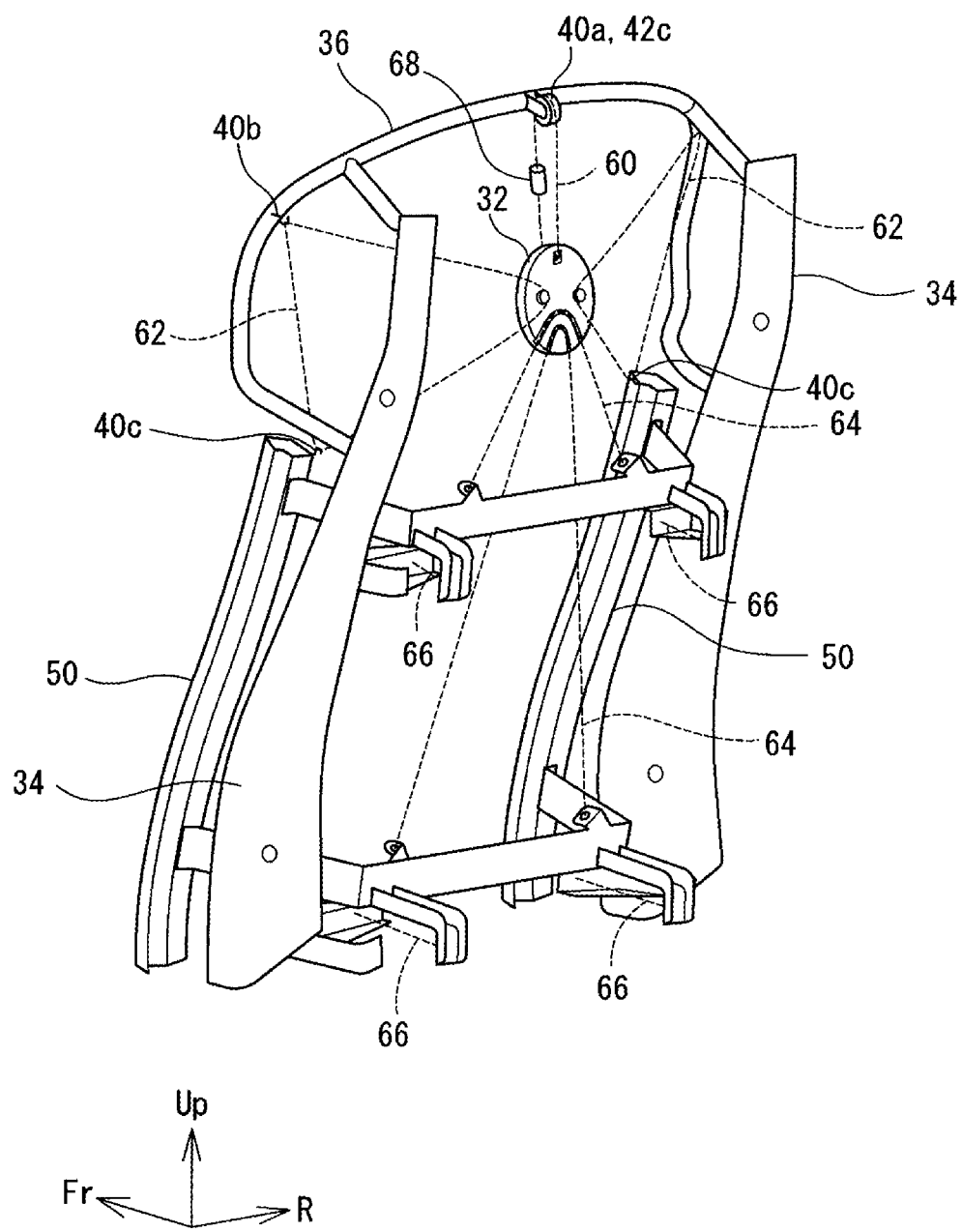
FIG. 4 is a perspective view showing how wires are placed.
Figure 5:
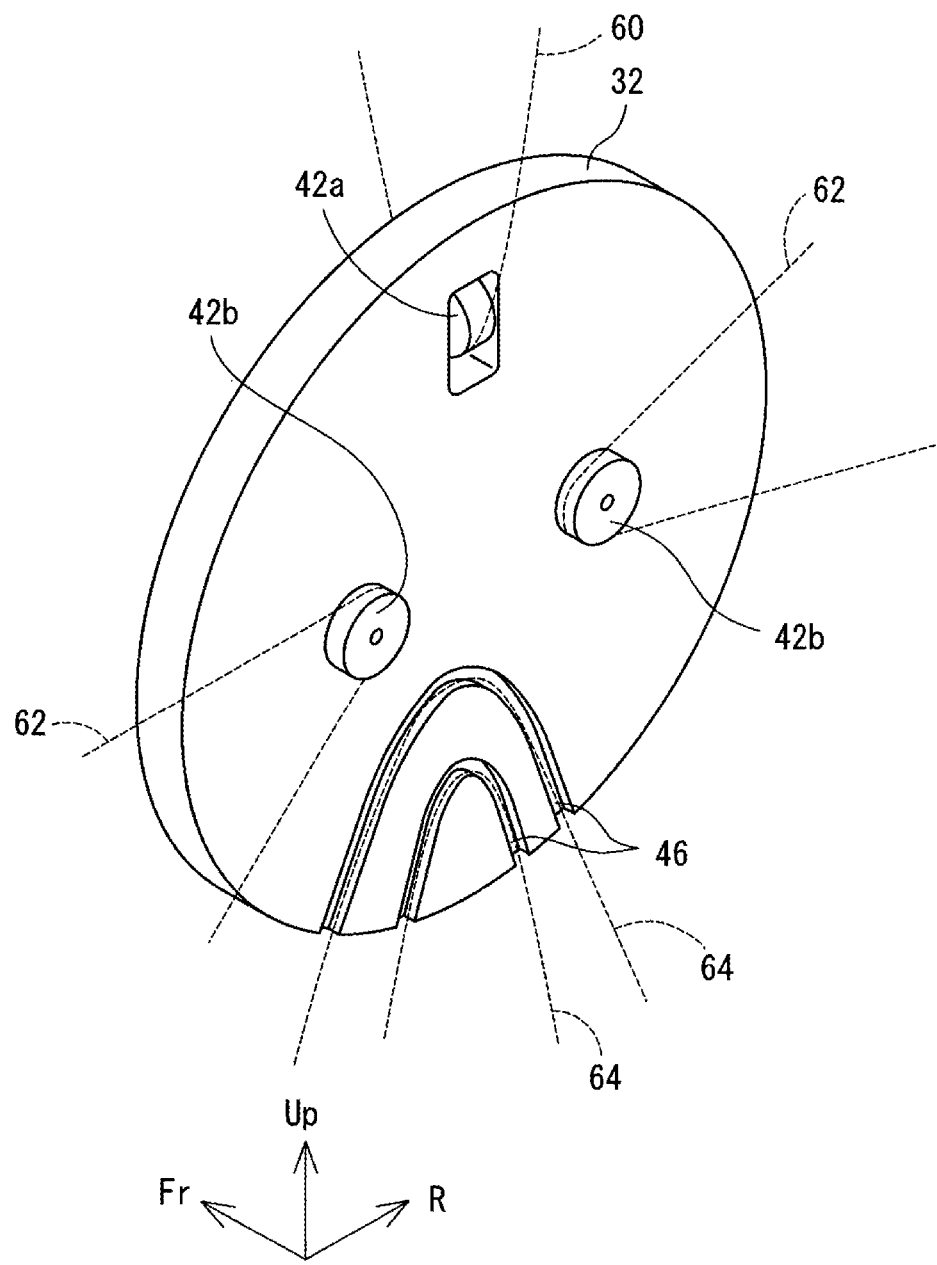
FIG. 5 is a perspective view of a relay disc.
Figure 6:
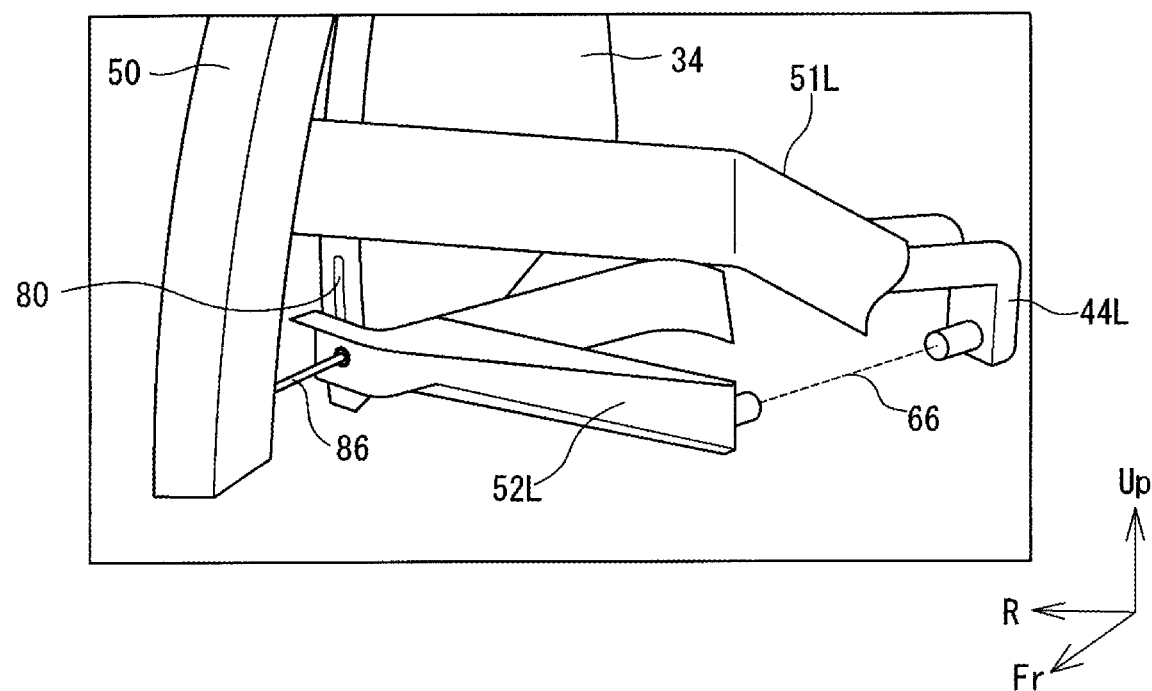
FIG. 6 is a perspective view of a portion around a front-back wire.

Description will now be given on how various wires supporting the back rest 26 or restricting the position of the back rest 26 are placed, with reference to FIGS. 4-6. FIG. 4 shows how the wires are placed. FIG. 5 is a perspective view of the relay disc 32, and FIG. 6 is a perspective view of a portion around the front-back wire 66. Note that the back rest 26 and the horizontal wire 58 are not shown in FIG. 4.

As clearly shown in FIG. 4, an upper wire 60, a pair of right and left wires 62, and two lower wires 64 extend radially from the relay disc 32. These wires 60, 62, and 64 function as suspension members for suspending and holding the back rest 26 so that it can swing with respect to the SB main frame 22. The relay disc 32 will be briefly described below prior to description of these wires 60, 62, and 64. Referring to FIG. 5, the relay disc 32 is provided with a first pulley 42a, two second pulleys 42b, and two wire grooves 46. The first pulley 42a is located at the 12 o'clock position of the relay disc 32, and has a rotating member rotatable around an axis extending in the right-left direction. A penetration hole penetrating in a thickness direction is formed at the position where the first pulley 42a is attached to the relay disc 32. The upper wire 60 is put around the first pulley 42a.

The second pulleys 42b are located at the 3 o'clock and 9 o'clock positions of the relay disc 32, and have a rotating member rotatable around an axis extending in the front-back direction. The right and left wires 62 are put around the second pulleys 42b. The two guide grooves 46 are formed at the 6 o'clock position of the relay disc 32. Note that the second pulleys 42b around which the right and left wires 62 are placed can be disposed at positions other than the 3 o'clock and 9 o'clock positions as long as they are provided one each on either side of the central line in the right-left direction of the relay disc 32. The two wire grooves 46 are both a V-shape, opening downward with one wire groove 46 located further inward and lower than the other wire groove 46. The inner and lower wire groove 46 opens at an angle that is larger than that of the outer and upper wire groove 46. A lower wire 64 is placed along the wire groove 46.

Description will now be given on how each of the wires 60, 62, and 64 is placed, with reference to FIG. 4. The upper wire 60 is placed between the relay disc 32 and the first engagement member 40a located above the relay disc 32. The first engagement member 40a is fixed to the support pipe 36 at a center thereof in the right-left direction, and located above the relay disc 32. The first engagement member 40a has a third pulley 42c, which has a rotating member rotatable around an axis extending in the right-left direction. The upper wire 60 is formed as a closed loop, running from the first pulley 42a of the relay disc 32 through the third pulley 42c of the support pipe 36 and a height adjustment mechanism 68, and returning to the first pulley 42a.

Note that the support pipe 36 to which the first engagement member 40a is fixed is part of the SB middle frame 30, and the position thereof is not changed with respect to the SB main frame 22. By holding the back rest 26 suspended from the above-described support pipe 36, the back rest 26 can swing with respect to the SB main frame 22. The height adjustment mechanism 68 for adjusting a height of the relay disc 32 by pulling in part of the upper wire 60 is attached on the route of the upper wire 60. The mechanism 68 will be described later.

The right and left wires 62 are placed in a substantially triangular closed loop running through the relay disc 32 and second and third engagement members 40b and 40c, respectively. The second engagement member 40b is fixed to the support pipe 36 at a position located rightward or leftward, and upward and forward, from the relay disc 32. The third engagement member 40c is fixed to an upper end of the vertical frame 50. By symmetrically placing the two right and left wires 62, the position of the back rest 26 is automatically determined at the neutral position where tensions of the two right and left wires 62 are balanced, that is, the position where the center of the back rest 26 in the right-left direction coincides with the center of the SB main frame 22 in the right-left direction. While the second and third engagement members 40b and 40c, respectively, are formed as hooks for hooking the wire in the illustrated example, the second and third engagement members 40b and 40c, respectively, may take other forms. For example, the second and third engagement members 40b and 40c, respectively, may have a pulley. The right and left wires 62 may be routed through a larger number of elements as long as they run at least through the relay disc 32 and the second and third engagement members 40b and 40c, respectively, and may also be placed in a quadrangular shape, or the like, rather than a triangular shape.

The lower wire 64 is a non-endless wire making a U-turn at the relay disc 32 with both its ends oriented downward from the relay disc 32. Both ends of the lower wire 64 are fixed to a pair of fourth or fifth engagement members 40d or 40e, respectively, provided on the horizontal frame 51.

As described above, the positions of the relay disc 32 and the back rest 26 to which the relay disc 32 is fixed are restrained by the plural wires 60, 62, and 64 with respect to the SB middle frame 30 (and therefore to the SB main frame 22). Such restraint is, however, not very strong. Appropriate flexure and inclination of the wires 60, 62, and 64 allow the back rest 26 and the SB sub frame 28 attached to the back rest 26 to swing around an axis extending in the front-back direction with respect to the SB main frame 22 with the relay disc 32 being the center.

The position of the back rest 26 in the front-back direction is restricted by the four front-back wires 66. Each of the front-back wires 66 has a front end fixed to the front restraint bracket 52, and a rear end fixed to the rear restraint bracket 44. Referring to FIG. 6, the lower rear restraint bracket 44L is fixed to the lower horizontal frame 51L of the SB sub frame 28, and the position thereof is not changed with respect to the SB sub frame 28. The lower front restraint bracket 52L is disposed in front of, and opposite to, the lower rear restraint bracket 44L. The lower front restraint bracket 52L is provided in contact with a front end of the side frame 34 of the SB middle frame 30, and the position of the lower front restraint bracket 52L in the front-back direction is not changed with respect to the side frame 34. By placing the front-back wire 66 between the lower front restraint bracket 52L and the lower rear restraint bracket 44L described above, rearward movements of the back rest 26 and SB sub frame 28 are restricted. In other words, the front-back wire 66 functions as a restraint component for restricting rearward movement of the SB sub frame 28 with respect to the SB main frame 22. While FIG. 6 shows the lower front restraint bracket 52L and the lower rear restraint bracket 44L as an example, the upper front restraint bracket 52U and the upper rear restraint bracket 44U have a similar structure. The front restraint bracket 52 can be elevated or lowered together with the SB sub frame 28, as described later.

The vehicle-mounted seat device 10 structured as described above allows the back rest 26 to swing around the axis in the front-back direction with respect to the SB main frame 22. As a result, sway in the right-left direction caused during travel of the vehicle can be absorbed by movement of a body rather than a head, thereby stabilizing posture of the head of a seated person. Further, because the back rest 26 which the back leans on is supported by plural wires, appropriate cushioning properties can be secured without a thick cushioning component (such as a urethane sheet), whereby weight of the vehicle-mounted seat device 10 can be reduced.

In addition, according to this example, the seat back 14 includes the SB main frame 22 and the SB assembly 24 attachable to the SB main frame 22. This allows use of a generally-used conventional SB main frame 22 without any change as the SB main frame 22, so that component cost can be reduced. Furthermore, the SB assembly 24 can be assembled independently from the SB main frame 22, thereby improving productivity of the SB main frame 22.

Stability of posture of a seated person's head is changed in accordance with the height of the swing center of the back rest 26. More specifically, posture of the head of the seated person can be made more stable by setting the height of the swing center of the back rest 26 to substantially the same as that of the shoulder blades of the seated person. However, the height of the shoulder blades of the person seated in the vehicle-mounted seat device 10 varies with physical size of the person.

Figure 7A:
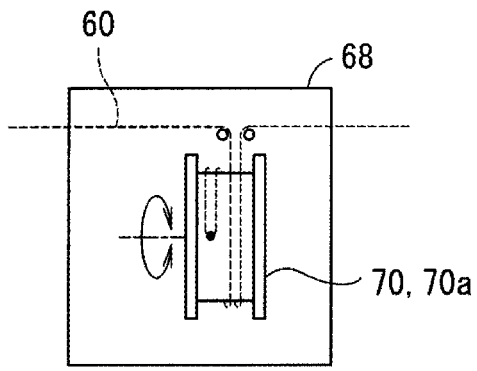
FIG. 7A shows an example of a height adjustment mechanism.

In view of the above, the vehicle-mounted seat device 10 described in this disclosure is designed to allow the height of the swing center of the back rest 26 to be freely changed, as described in detail below. In order to change the height of the swing center of the back rest 26, i.e. that of the relay disc 32, the height adjustment mechanism 68 is provided in this example. As described above, the height adjustment mechanism 68 is the mechanism for pulling in part of the upper wire 60 to change the disposed height of the relay disc 32 with respect to the first engagement member 40a. The height adjustment mechanism 68 has a movable member 70 for moving manually or automatically with part of the upper wire 60 connected or hooked thereto. For example, as illustrated in FIG. 7A, the height adjustment mechanism 68 may have a rotatable wind-up bobbin 70a, to which part of the upper wire 60 is fixed, as the movable member 70. In this structure, forward or reverse rotation of the wind-up bobbin 70a winds or rewinds the upper wire 60, thereby increasing or decreasing the amount of the upper wire 60 pulled into the height adjustment mechanism 68. As a result, the disposed height of the relay disc 32 with respect to the first engagement member 40a is elevated or lowered.

Figure 7B:
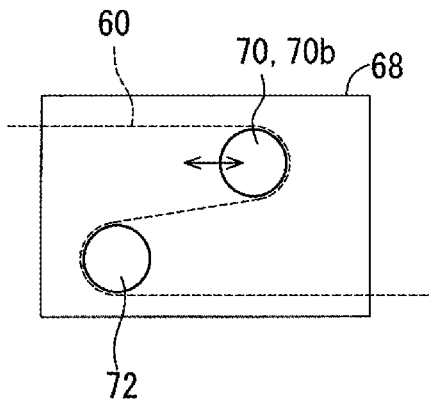
FIG. 7B shows another example of the height adjustment mechanism.

Alternatively, the height adjustment mechanism 68 may have a fixed pin 72 and the movable pin 70a to which the upper wire 60 is hooked as shown in FIG. 7B. In this structure, the upper wire 60 is hooked to the fixed pin 72 and the movable pin 70b so as to make a U-turn at each of the pins 72 and 70b. The upper wire 60 detours in an N-shape when viewed as a whole. The movable pin 70b is the movable member 70 capable of moving with respect to the fixed pin 72. In this structure, the movable pin 70b moves closer to the fixed pin 72, thereby reducing the amount of pulling in the upper wire 60 to lower the disposed height of the relay disc 32. When the movable pin 70b moves away from the fixed pin 72, the upper wire 60 is pulled in by an increased amount to elevate the disposed height of the relay disc 32.

Figure 7C:
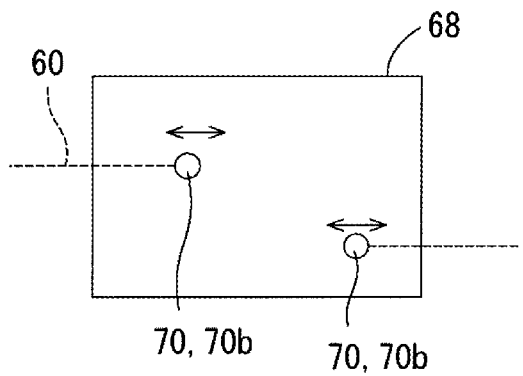
FIG. 7C shows a further example of the height adjustment mechanism.

The height adjustment mechanism 68 may also have plural movable members 70. For instance, as illustrated in FIG. 7C, the height adjustment mechanism 68 may have, as the movable member 70, two movable pins 70b which can advance or retreat in a direction moving close to or away from each other. In this structure, the upper wire 60 may be an ended-wire, with the two ends thereof connected to the movable pins 70b different from each other. Such a configuration makes it possible to bring the two movable pins 70b close to or away from each other so as to change, i.e.

increase or decrease, the amount by which the upper wire 60 is pulled in, and therefore to change the disposed height of the relay disc 32.

The height adjustment mechanism 68 may have an actuator for moving such a movable member 70. The actuator may have a motor, a power cylinder, or the like as a driving source. The height adjustment mechanism 68 may also have an operation part for manually moving the movable member 70, such as a handle, a lever, or the like. The height adjustment mechanism 68 may also have a brake for stopping the movable member at a desired position, as necessary. The height adjustment mechanism 68 may also have a variety of sensors, such as an encoder, for measuring the movement amount of the movable member 70, and accordingly the amount of pulling in the upper wire 60.

In any of the above configurations, by thus providing the height adjustment mechanism 68 for pulling part of the upper wire 60, the disposed height of the relay disc 32 with respect to the first engagement member 40*a* and therefore the height of the swing center of the back rest 26 with respect to the SB main frame 22 can be freely altered. Consequently, the swing center of the back rest 26 can be set in accordance with physical size of a seated person, thereby causing the back rest 26 to swing more appropriately.

When the pulled amount of the upper wire 60 is changed, the upper wire 60 moves by sliding at the first engagement member 40*a* and the relay disc 32. In this example, the first engagement member 40*a* and the relay disc 32 are provided with the pulley 42 for hooking the upper wire 60, thereby significantly reducing friction in sliding movement of the upper wire 60, to achieve smooth movement of the upper wire 60. As a result, wear of the upper wire 60 can be effectively prevented. However, the pulley 42 may not be provided if wear can be sufficiently reduced. Further, while the upper wire 60 is placed in a loop in this example, it may be placed in a straight line. More specifically, one end of the ended upper wire 60 may be fixed to the first engagement member 40*a* with the other end fixed to the relay disc 32. In this case, the pulley 42 for hooking the upper wire 60 is naturally unnecessary for the relay disc 32 and the first engagement member 40*a*.

Figure 8:
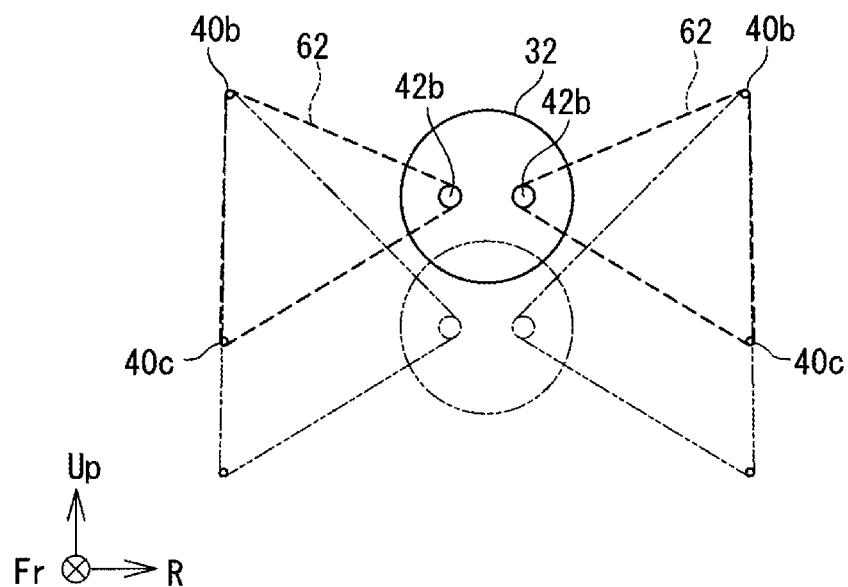
FIG. 8 is a view showing an image of an elevated/lowered relay disc from behind.
Figure 9:
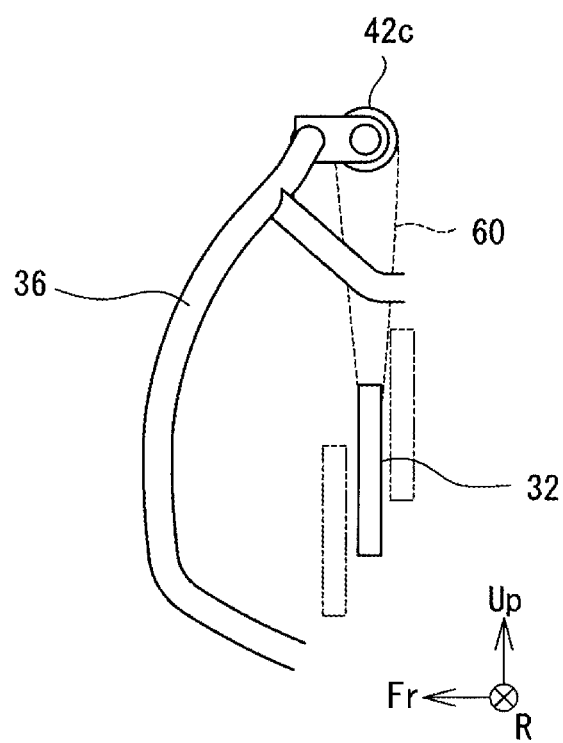
FIG. 9 is a view showing an image of the elevated/lowered relay disc from the side.

Note that the position of the relay disc 32 is also changed in the front-back direction when it is elevated or lowered in order to maintain tension of the horizontal wire 58, as described below with reference to FIG. 8 and FIG. 9. FIG. 8 and FIG. 9 show images of the relay disc 32 being elevated or lowered. FIG. 8 shows the relay disc 32 from behind, while FIG. 9 shows the disc 32 from the side. As is apparent from the above description, the second engagement member 40*b* is fixed with respect to the SB main frame 22. Therefore, when the disposed height of the relay disc 32 with respect to the SB main frame 22 is changed, the relative heights of the relay disc 32 and the third engagement member 40*c* with respect to the second engagement member 40*b* are also changed, as shown in FIG. 8. At this time, in order to maintain a constant tension of the horizontal wire 58, the relay disc 32 moves in the front-back direction, as well as the up-down direction, to the position where tensions of the upper wire 60 and the pair of right and left wires 62 are balanced as shown in FIG. 9. For example, when the relay disc 32 is lowered to increase the distance between the second engagement member 40*b* and the relay disc 32 in the up-down direction, the relay disc 32 also moves forward so as to reduce the distance from the second engagement member 40*b* in the front-back direction, thereby maintaining a constant tension of the right and left wires 62. As a result, the swingability of the back rest 26 can be kept constant even if the height of the swing center of the back rest 26 is changed.

Figure 10:
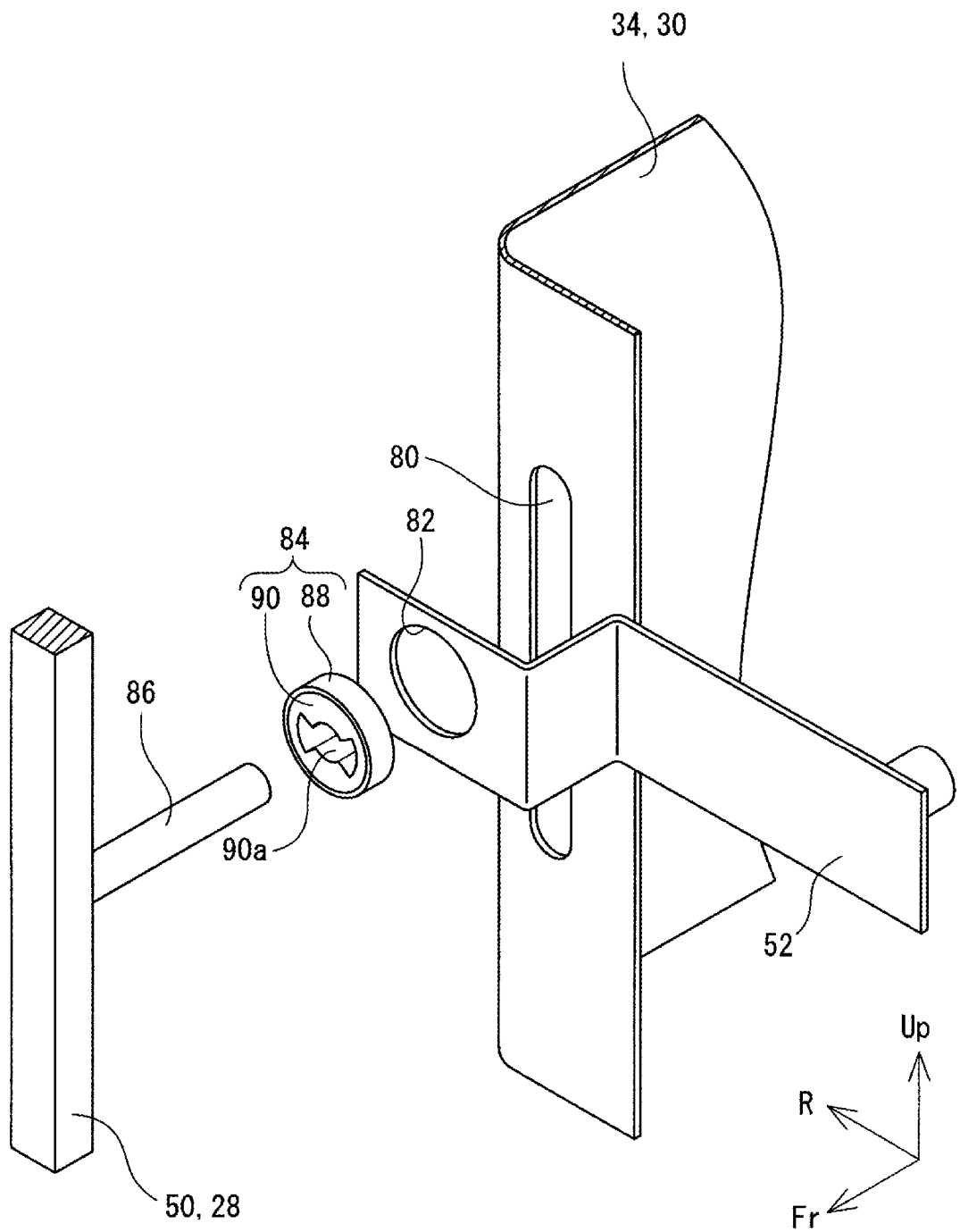
FIG. 10 is an exploded perspective view schematically showing a portion around a lower front restraint bracket.
Figure 11:
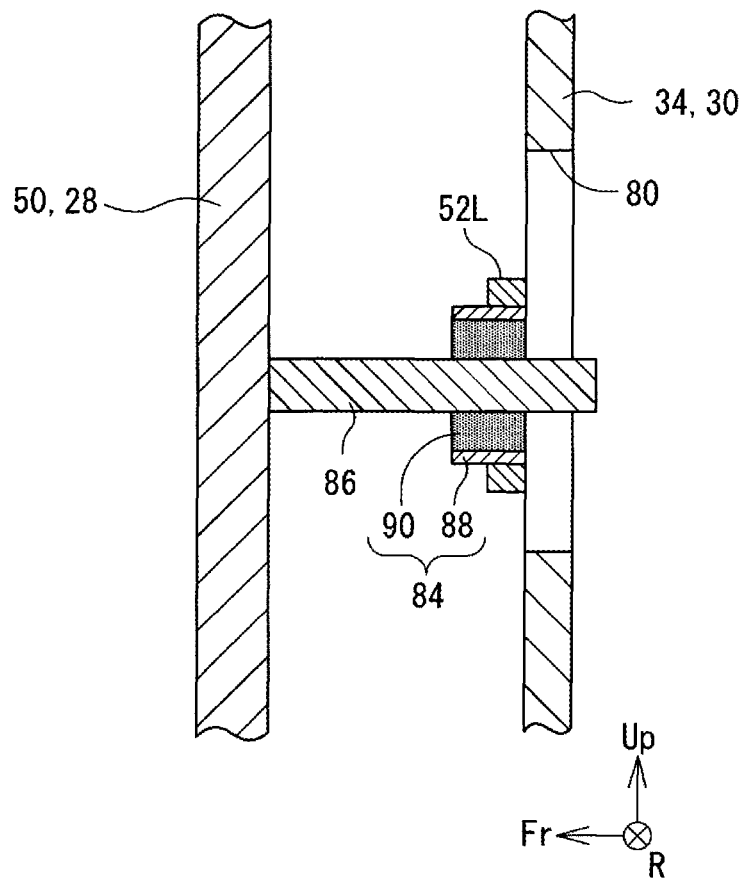
FIG. 11 is a schematic view showing a vertical cross section of the portion around the lower front restraint bracket.
Figure 12:
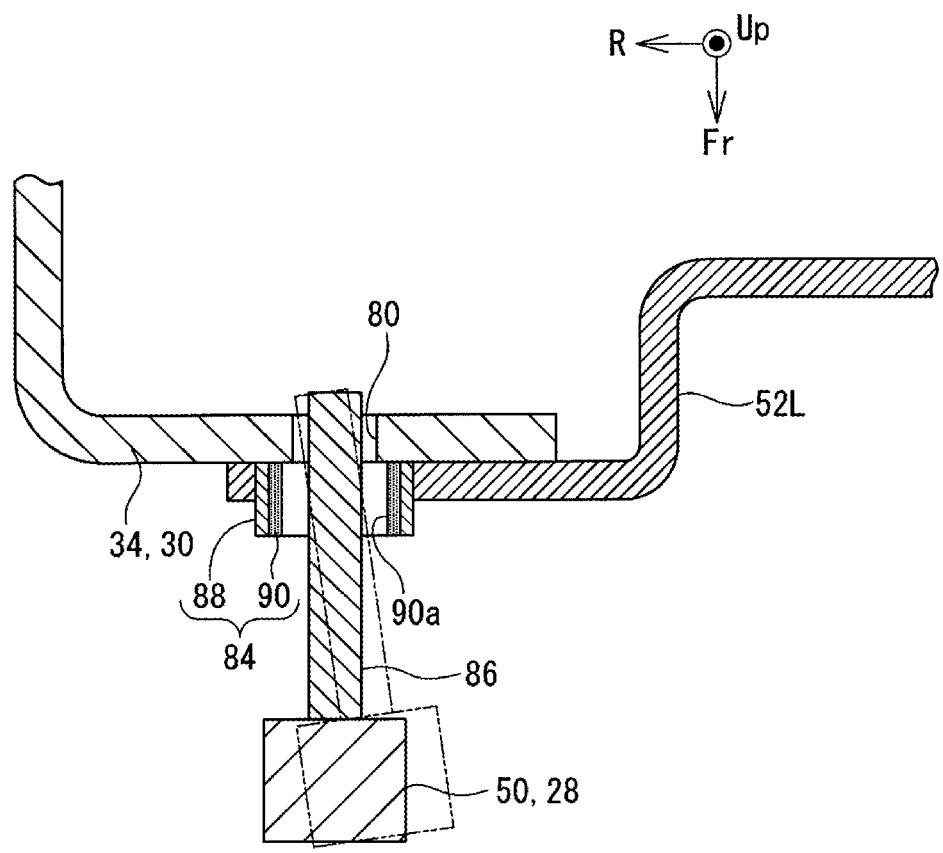
FIG. 12 is a schematic view showing a horizontal cross section of the portion around the lower front restraint bracket.

On the other hand, tension of the front-back wire 66 cannot be maintained by front-back movement of the relay disc 32. Accordingly, in this example, the front restraint bracket 52 can be elevated or lowered together with the SB sub frame 28 to keep the tension of the front-back wire 66 constant even when the relay disc 32 is elevated or lowered, as described below with reference to FIG. 6 and FIGS. 10-12. FIG. 10 is an exploded perspective view schematically showing a portion around the lower front restraint bracket 52L. FIG. 11 is a vertical cross-sectional view schematically showing the portion around the lower front restraint bracket 52L. FIG. 12 is a horizontal cross-sectional view schematically showing the portion around the lower front restraint bracket 52L.

As described with reference to FIG. 6, the front-back wire 66 is placed between the lower rear restraint bracket 44L and the lower front restraint bracket 52L. By thus providing the front-back wire 66, the positions of the SB sub frame 28 and the back rest 26 are defined in the front-back direction with respect to the SB main frame 22.

Note that the rear restraint bracket 44 is fixed to the SB sub frame 28. Therefore, when the relay disc 32 and the back rest 26 are elevated or lowered, the rear restraint bracket 44 is also elevated or lowered. If the front restraint bracket 52 is not elevated or lowered together with the rear restraint bracket 44, tension of the front-back wire 66 is changed, causing a change in position of the back rest 26 in front-back direction with respect to the SB main frame 22.

In view of the above, in this example, the position of the front restraint bracket 52 in the front-back direction is fixed with respect to the SB middle frame 30, and the position of the front restraint bracket 52 in the up-down direction is fixed with respect to the SB sub frame 28. More specifically, the lower front restraint bracket 52L is connected to the SB middle frame 30 and the SB sub frame 28 through a connection bush 84 and a connection pin 86.

The connection bush 84 is a bush fixed to an assembly hole 82 of the lower front restraint bracket 52L, and has an elastic part 90 made of an elastic material such as rubber, silicon, or the like, and an outer ring 88 surrounding the elastic part 90 and formed of a rigid body such as metal. The elastic part 90 has a central hole 90*a* penetrating in the thickness direction at a center thereof. The central hole 90*a* is shaped like a candy, having a fan-shaped hole connected to the circular hole on each of the right and left sides. The diameter of the circular portion of the central hole 90*a* is substantially the same as that of the connection pin 86.

The connection pin 86 is a pin formed of a rigid body such as metal. The connection pin 86 has a front end fixed to the vertical frame 50 of the SB sub frame 28. The connection pin 86 is inserted through the central hole 90*a* of the connection bush 84 and a guide slit 80. The guide slit 80 is provided at a front end of the side frame 34 of the SB middle frame 30, and formed as an elongated hole extending in the up-down direction. The width of the guide slit 80 is sufficiently larger than the diameter of the connection pin 86.

In the above-described structure, the connection pin 86 is also elevated or lowered when the SB sub frame 28 is elevated or lowered. The connection bush 84 through which the connection pin 86 is inserted and the lower front restraint bracket 52L to which the connection bush 84 is fixed are also elevated or lowered together with movement of the SB sub frame 28. In the meantime, the lower front restraint bracket 52L does not move rearward because the bracket 52L is in contact with the front end of the side frame 34 of the SB middle frame 30. In other words, the position of the lower front restraint bracket 52L in the front-back direction is fixed with respect to the SB middle frame 30. As a result, the tension of the front-back wire 66 is maintained constant to restrict the rearward movement of the back rest 26 even if the lower front restraint bracket 52L is elevated or lowered together with the relay disc 32. The upper front restraint bracket 52U has the same structure.

In this example, the central hole 90a of the connection bush 84 has a candy shape elongated in the right-left direction, and the guide slit 80 has a sufficiently larger width than the connection pin 86. Consequently, the connection pin 86 can swing in the right-left direction as shown in FIG. 12, so that the SB sub frame 28 and the back rest 26 can swing in the right-left direction.

Note that the above-described structure of the front restraint bracket 52 is only an example, and the structure may be varied as needed as long as the tension of the front-back wire 66 can be kept constant. For example, while the elastic part 90 of the connection bush 84 is provided with the candy-shaped central hole 90a that is elongated in the right-left direction in this example, the connection bush 84 may be provided with other structures as long as movement of the connection pin 86 in the up-down direction is restricted while tolerating its right-left movement with respect to the connection bush 84.

Figure 13:
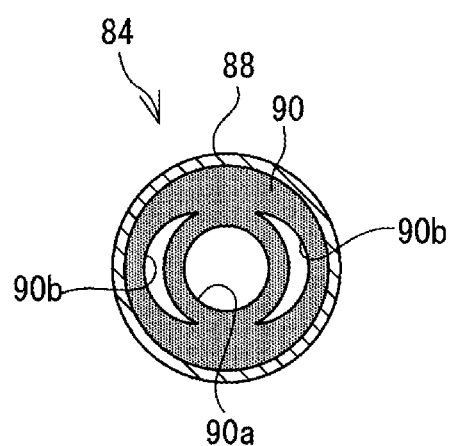
FIG. 13 shows another example of a connection bush.
Figure 14:
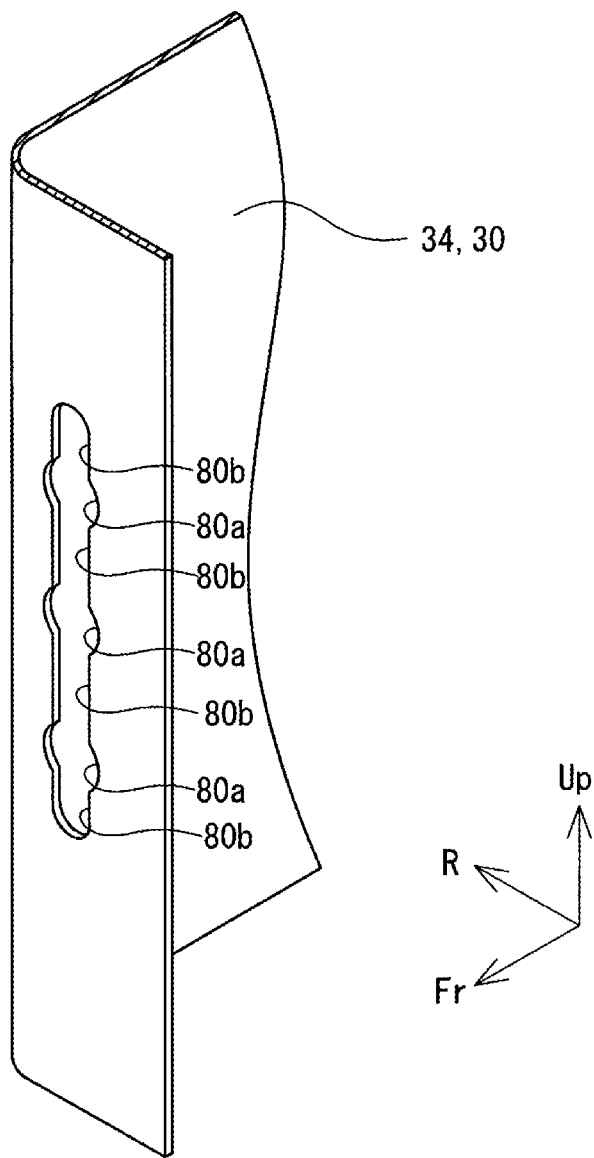
FIG. 14 shows another example of a guide slit.
Figure 15:
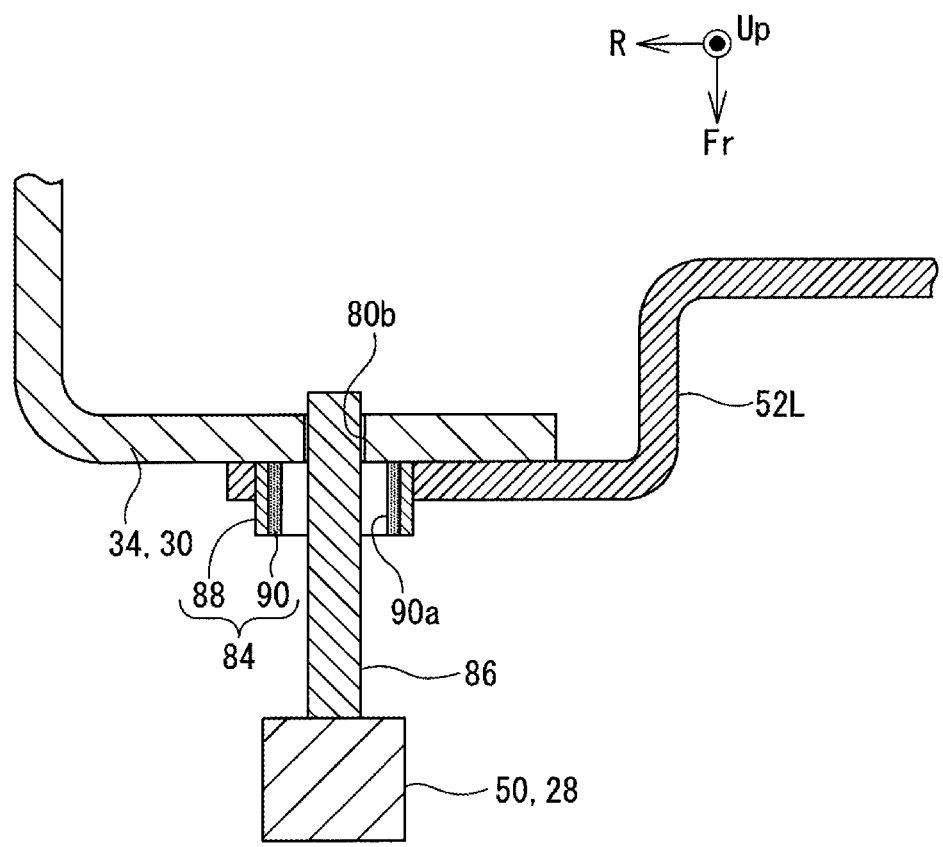
FIG. 15 is a schematic view showing a horizontal cross section of the portion around the front restraint bracket when a connection pin is located at the same height as a smaller width portion.

For example, the central hole 90a may be formed as a completely circular shape, with a recess 90b formed on each of the right and left sides of the central hole 90a, as shown in FIG. 13. The guide slit 80 may have a form in which a larger width portion 80a having a width sufficiently larger than the diameter of the connection pin 86 and a smaller width portion 80b having a width substantially the same as the diameter of the connection pin 86, arranged vertically, as shown in FIG. 14. In such a configuration, swingability of the back rest 26 can be varied with change in height of the relay disc 32. More specifically, if the connection pin 86 is located at the same height as the smaller width portion 80b, the connection pin 86 can hardly swing in the right-left direction because of interference with a peripheral edge of the smaller width portion 80b, as shown in FIG. 15. As a result, the SB sub frame 28 and the back rest 26 are prevented from swinging in the right-left direction. On the other hand, if the connection pin 86 is located at substantially the same height as the larger width portion 80a, the connection pin 86 and the back rest 26 can swing in the right-left direction, as described above with reference to FIG. 12.

The above-described configuration is merely an example. As long as the height adjustment mechanism 68 for pulling in part of the upper wire 60 is provided in the vehicle-mounted seat device 10 where the back rest 26 is suspended and held by the upper wire 60, other structures may be varied. For example, while the back rest 26 and the SB sub frame 28 are connected through the SB middle frame 30 to the SB main frame 22 in the above-description, SB middle frame 30 need not be provided. In this case, the first and second engagement members 40a and 40b can be formed in the SB main frame 22. The front restraint bracket 52 can be connected to the SB sub frame 28 and the SB main frame 22. In addition, the wires 60, 62. 64, and 66 may be arranged in a suitable manner in accordance with the desired specification of the vehicle-mounted seat device 10. For example, the right and left wires 62 may be placed only between the second engagement member 40b (i.e. the support frame) and the relay disc 32, without going through the third engagement member 40c (i.e. the SB sub frame 28). Further, wire may be substituted by other linear members such as a rope, string, belt, chain, or the like, as long as it can suspend and hold the back rest 26.

Figure 16:
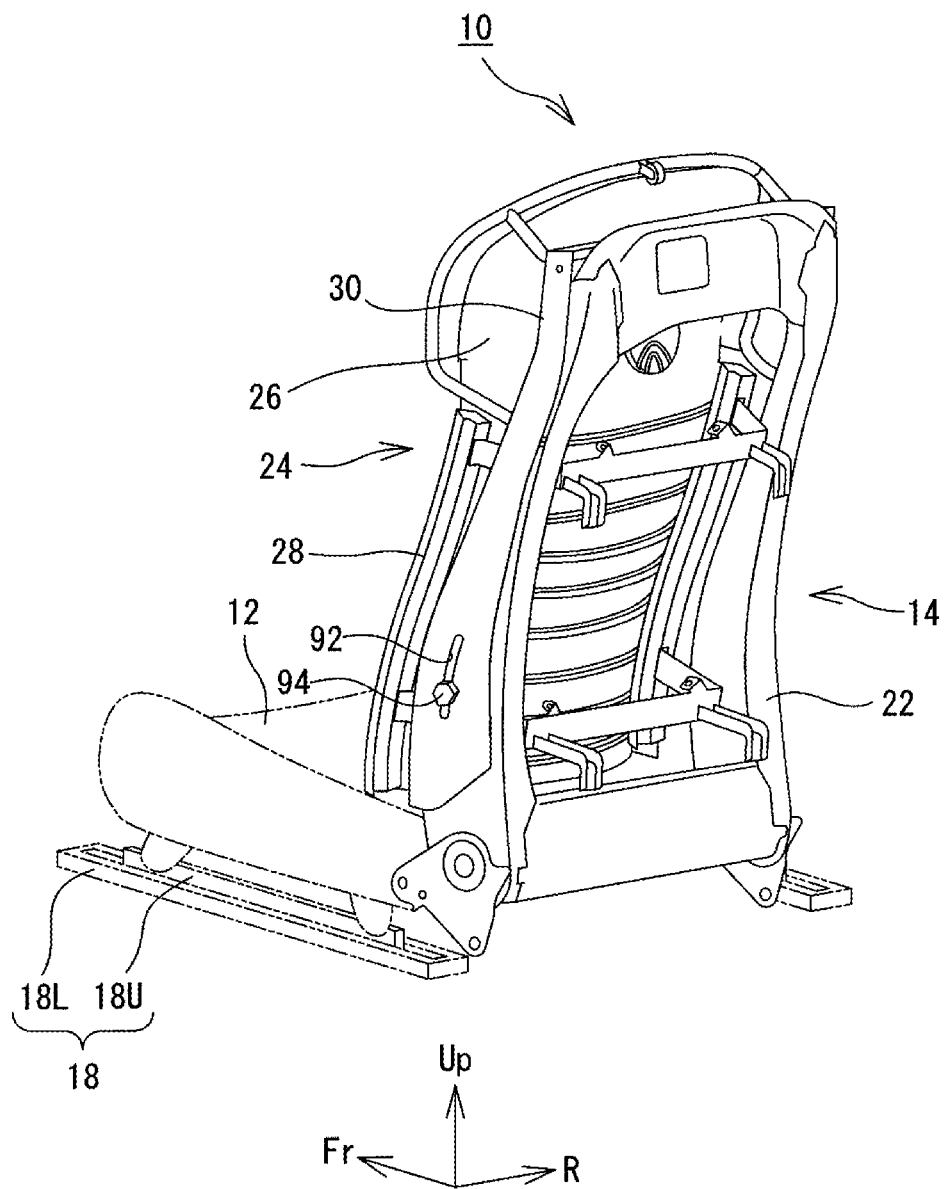
FIG. 16 is a perspective view of a vehicle-mounted seat device according to a modification.

Finally, a modification will be briefly described. FIG. 16 is a perspective view of the vehicle-mounted seat device 10 of a modification. In this vehicle-mounted seat device 10, the height of the SB assembly 24 can be changed with respect to the SB main frame 22, whereby the height of the relay disc 32 (i.e. the swing center of the back rest 26) can be changed with respect to the SB main frame 22. The height at which the SB assembly 24 is mounted may be changed manually or automatically. For example, a circular hole (not shown in FIG. 16) through which a fastening bolt 94 is inserted may be formed on the side surface of the SB main frame 22, and an elongated hole 92 which extends in the up-down direction and through which the fastening bolt 94 is inserted may be formed on the side frame 34 of the SB middle frame 30. With this structure, the SB assembly 24 can be elevated or lowered with respect to the SB main frame 22 by loosening the fastening bolt 94. Note that the restraint brackets and the engagement members for the respective wires 60, 62, 64, and 66 are provided at the SB assembly 24, so that the relative positions of the respective engagement members and the restraint brackets are not changed even if the entire SB assembly 24 is elevated or lowered. In other words, in a structure where the SB assembly 24 is elevated or lowered as a whole, the tensions of the respective wires 60, 62, and 66 are kept constant even if the relay disc 32 is elevated or lowered, thereby eliminating the need for the complicated mechanism for maintaining the tensions of the respective wires 60, 62, and 66.

The invention claimed is:

1. A vehicle-mounted seat device, comprising:
a seat back main frame standing in a vehicle cabin;
a back rest which is configured to support the back of a seated person;
a relay disc fixed at a center of the back rest in a width direction;
a first engagement member fixed with respect to the seat back main frame at a position higher than the relay disc;
an upper wire provided between the relay disc and the first engagement member for suspending and holding the back rest so as to be able to swing with respect to the seat back main frame with the relay disc being the center; and
a height adjustment mechanism constructed to be capable of pulling in part of the upper wire for changing a disposed height of the back rest with respect to the seat back main frame by changing an amount by which the upper wire is pulled in, the height adjustment mechanism comprises a fixed pin and a movable pin movable with respect to the fixed pin, the upper wire hooked to the fixed pin and the movable pin, wherein when the movable pin moves away from the fixed pin, the upper wire is pulled in by an increased amount to elevate the relay disc.

2. The vehicle-mounted seat device according to claim 1, wherein
the first engagement member and the relay disc are each provided with a pulley for hooking the upper wire, and
the upper wire is provided in a form of a closed loop routed through the first engagement member and the relay disc.

3. The vehicle-mounted seat device according to claim 1, further comprising
   a seat back sub frame mounted to the back rest and capable of swinging together with the back rest with respect to the seat back main frame, and
   a seat back middle frame fixed to the seat back main frame, wherein
   the back rest is suspended and held by the upper wire from the seat back middle frame so as to be able to swing with respect to the seat back middle frame, and
   the back rest and the seat back sub frame are mounted to the seat back main frame through the seat back middle frame.

4. The vehicle-mounted seat device according to claim 3, further comprising
   a rear restraint bracket fixed to the seat back sub frame,
   a front restraint bracket disposed in front of, and opposite to, the rear restraint bracket, and
   a restraint component placed between the rear restraint bracket and the front restraint bracket, and provided as a linear member for defining a position of the seat back sub frame in a front-back direction with respect to the seat back middle frame, wherein
   the front restraint bracket is mounted to the seat back middle frame so as to be elevated or lowered together with the seat back sub frame.

5. The vehicle-mounted seat device according to claim 4, further comprising
   a guide slit formed in a seat back middle frame and elongated in an up-down direction,
   a connection bush fixed to the front restraint bracket and having a penetration hole formed at a center thereof, and
   a connection pin inserted through the penetration hole of the connection bush and the guide slit, and having an end connected to the seat back sub frame, wherein
   the connection pin is elevated or lowered together with the seat back sub frame to cause the front restraint bracket to be elevated or lowered.

6. The vehicle-mounted seat device according to claim 3, further comprising
   a pair of right and left second engagement members provided in a right-left direction of the relay disc, and fixed with respect to the seat back main frame,
   a pair of right and left third engagement members provided in the right-left direction of the relay disc, and fixed with respect to the seat back sub frame,
   a pair of right and left wires provided in a closed loop and routed through at least the second engagement member, the relay disc, and the third engagement member, wherein
   when the amount by which the upper wire is pulled in is changed, the relay disc moves in a front-back direction, as well as an up-down direction, so as to balance tensions of the upper wire and the pair of right and left wires.

7. The vehicle-mounted seat device according to claim 6, wherein
   a second pulley for hooking a corresponding one of the pair of right and left wires is provided on either side of a central line of the relay disc in the right-left direction.

8. A vehicle-mounted seat device, comprising:
   a seat back main frame standing in a vehicle cabin;
   a back rest which is configured to support the back of a seated person;
   a seat back sub frame mounted to the back rest and capable of swinging together with the back rest with respect to the seat back main frame;
   a seat back middle frame fixed to the seat back main frame, a guide slit formed in a seat back middle frame and elongated in an up-down direction, wherein the back rest is suspended and held by the upper wire from the seat back middle frame so as to be able to swing with respect to the seat back middle frame, and wherein the back rest and the seat back sub frame are mounted to the seat back main frame through the seat back middle frame;
   a rear restraint bracket fixed to the seat back sub frame;
   a front restraint bracket disposed in front of, and opposite to, the rear restraint bracket;
   a connection bush fixed to the front restraint bracket and having a penetration hole formed at a center thereof, a connection pin inserted through the penetration hole of the connection bush and the guide slit, and having an end connected to the seat back sub frame, wherein the connection pin is elevated or lowered together with the seat back sub frame to cause the front restraint bracket to be elevated or lowered;
   a restraint component placed between the rear restraint bracket and the front restraint bracket, and provided as a linear member for defining a position of the seat back sub frame in a front-back direction with respect to the seat back middle frame, wherein the front restraint bracket is mounted to the seat back middle frame so as to be elevated or lowered together with the seat back sub frame;
   a relay disc fixed at a center of the back rest in a width direction;
   a first engagement member fixed with respect to the seat back main frame at a position higher than the relay disc;
   an upper wire provided between the relay disc and the first engagement member for suspending and holding the back rest so as to be able to swing with respect to the seat back main frame with the relay disc being the center; and
   a height adjustment mechanism constructed to be capable of pulling in part of the upper wire for changing a disposed height of the back rest with respect to the seat back main frame by changing an amount by which the upper wire is pulled in.

9. The vehicle-mounted seat device according to claim 8, wherein
   the first engagement member and the relay disc are each provided with a pulley for hooking the upper wire, and
   the upper wire is provided in a form of a closed loop routed through the first engagement member and the relay disc.

10. The vehicle-mounted seat device according to claim 8, further comprising
    a pair of right and left second engagement members provided in a right-left direction of the relay disc, and fixed with respect to the seat back main frame,
    a pair of right and left third engagement members provided in the right-left direction of the relay disc, and fixed with respect to the seat back sub frame,
    a pair of right and left wires provided in a closed loop and routed through at least the second engagement member, the relay disc, and the third engagement member, wherein
    when the amount by which the upper wire is pulled in is changed, the relay disc moves in a front-back direction, as well as an up-down direction, so as to balance tensions of the upper wire and the pair of right and left wires.

11. The vehicle-mounted seat device according to claim 10, wherein
a second pulley for hooking a corresponding one of the pair of right and left wires is provided on either side of a central line of the relay disc in the right-left direction.

* * * * *